United States Patent [19]

Luchtmans et al.

[11] 4,292,521
[45] Sep. 29, 1981

[54] RADIOGRAPHIC DEVICE AND METHOD FOR RECOVERING INFORMATION FROM OVER-EXPOSED RADIOGRAPHS

[75] Inventors: Fernand Luchtmans; Pierre Jehenson, both of Varese; Angelo Pisoni, Luino, all of Italy

[73] Assignee: European Atomic Energy Community (EURATOM), Luxembourg, Luxembourg

[21] Appl. No.: 29,936

[22] Filed: Apr. 13, 1979

[30] Foreign Application Priority Data

Apr. 17, 1978 [IT] Italy ............................... 48929 A/78

[51] Int. Cl.³ ...................... G03B 27/04; G03B 41/16; G01N 21/00; G01N 23/00
[52] U.S. Cl. ................................... 250/323; 250/455; 250/496; 355/121
[58] Field of Search ............... 250/451, 455, 475, 323, 250/496, 493; 355/121, 113, 122, 124

[56] References Cited

U.S. PATENT DOCUMENTS

| | | | |
|---|---|---|---|
| 1,101,468 | 6/1914 | Parfitt | 355/124 |
| 2,184,599 | 12/1939 | Jenny et al. | 250/475 |
| 2,890,345 | 6/1959 | Muffly | 250/493 |
| 3,121,792 | 2/1964 | Mittelstaedt | 250/323 |
| 3,564,242 | 2/1971 | Lescrenier . | |
| 4,104,519 | 8/1978 | Oldendorf | 250/274 |
| 4,104,528 | 4/1978 | Strax | 250/469 |

FOREIGN PATENT DOCUMENTS 1049471 8/1953 France .
1071013 3/1954 France .

OTHER PUBLICATIONS

Freitag et al., "Über die Technik der Kontaktmicroradiographie," *Electromedica*, vol. 43, No. 2, pp. 52-54.

*Primary Examiner*—Alfred E. Smith
*Assistant Examiner*—T. N. Grigsby
*Attorney, Agent, or Firm*—Stevens, Davis, Miller & Mosher

[57] ABSTRACT

A device for recovering information from overexposed regions of image recording emulsions in general, and radiographs in particular includes a light-tight housing the outer surface of which is covered with a layer of lead, a source arranged to project ionizing radiation within said housing, and a removeable cassette which, in use, carries the over-exposed radiograph in close contact with a further film for recording the information. The cassette has a light-tight cover which is displaceable to permit exposure of the further film to an image produced by irradiation of the over-exposed radiograph by the source. The method includes irradiating the over-exposed radiograph, placed in close contact with a further film, by means of a device as aforesaid.

8 Claims, 3 Drawing Figures

RADIOGRAPHIC DEVICE AND METHOD FOR RECOVERING INFORMATION FROM OVER-EXPOSED RADIOGRAPHS

FIELD OF THE INVENTION

The present invention relates to a device and to a method for recovering information hidden within an over-exposed region of an image recording emulsion, which may be a silver halide based radiographic or photographic emulsion.

BACKGROUND TO THE INVENTION

The non-destructive examination of a test piece by recording an image produced by the differential absorption of ionizing radiation often results in a radiograph having over-exposed portions. Such over-exposure may be due to characteristics of the test piece, such as dimensional variations (e.g. large variations of thickness), or variations in the coefficients of absorption of the radiation used for different materials in the test piece (e.g. steel, plastics, weld material, wiring, biological tissue etc.). Further the emulsion may be accidentally over-exposed.

Such over-exposed regions may contain important information of which the derivation is desirable or necessary, but due to their excessively high density cannot be interpreted by conventional means. It therefore becomes desirable to transform the high density of blackening in these regions into a density range which will permit interpretation, so as to derive the previously hidden information, in a negatoscope, microscope or densitometer.

SUMMARY OF THE INVENTION

According to the invention, there is provided a radiographic device for use in deriving information from an over-exposed region of a first film, the device comprising
- a light-tight housing,
- a source of ionizing radiation,
- a removable cassette for carrying the first film in close contact with a second film on which said information is to be recorded, and
- a layer of lead covering the exterior of said housing, the cassette having a light-tight cover which is displaceable to permit exposure of said second film to an image produced by irradiation of the first film by the source.

The invention also provides a method of deriving information from an over-exposed region of a first film, wherein the first film is placed in direct contact with a second film, and is irradiated with ionizing radiation in a radiographic device as defined above to expose the second film to an image including the required information.

In one embodiment, the source is an X-ray tube mounted to project X-rays into the interior of a diverging, bell-shaped housing toward the cassette.

In another embodiment, the source is a homogeneous monochromatic isotope solution, preferably containing a single isotope, which may be $Fe^{55}$.

The method can be used, e.g. to record variations in the thickness of steel between 1 and 50 mm on a single final negative. Optimum results can also be obtained when testing objects of greatly varying thickness, e.g. tubes, round objects and miscellaneous objects having components of materials which exhibit wide variation in absorption of ionizing radiation, e.g. for example, an electric motor having components of such different materials as plastics, rubber, aluminium, steel, brass and tin.

The method has many varied applications, not limited to industrial or medical radiography or the fine arts (e.g. examination of paintings and sculptures). The method can also be applied to black and white high-contrast photographs emulsions or, in the field of nuclear energy, to neutroradiography, radiography or autoradiography of previously-irradiated components.

DESCRIPTION OF THE EMBODIMENTS

Figure 1:
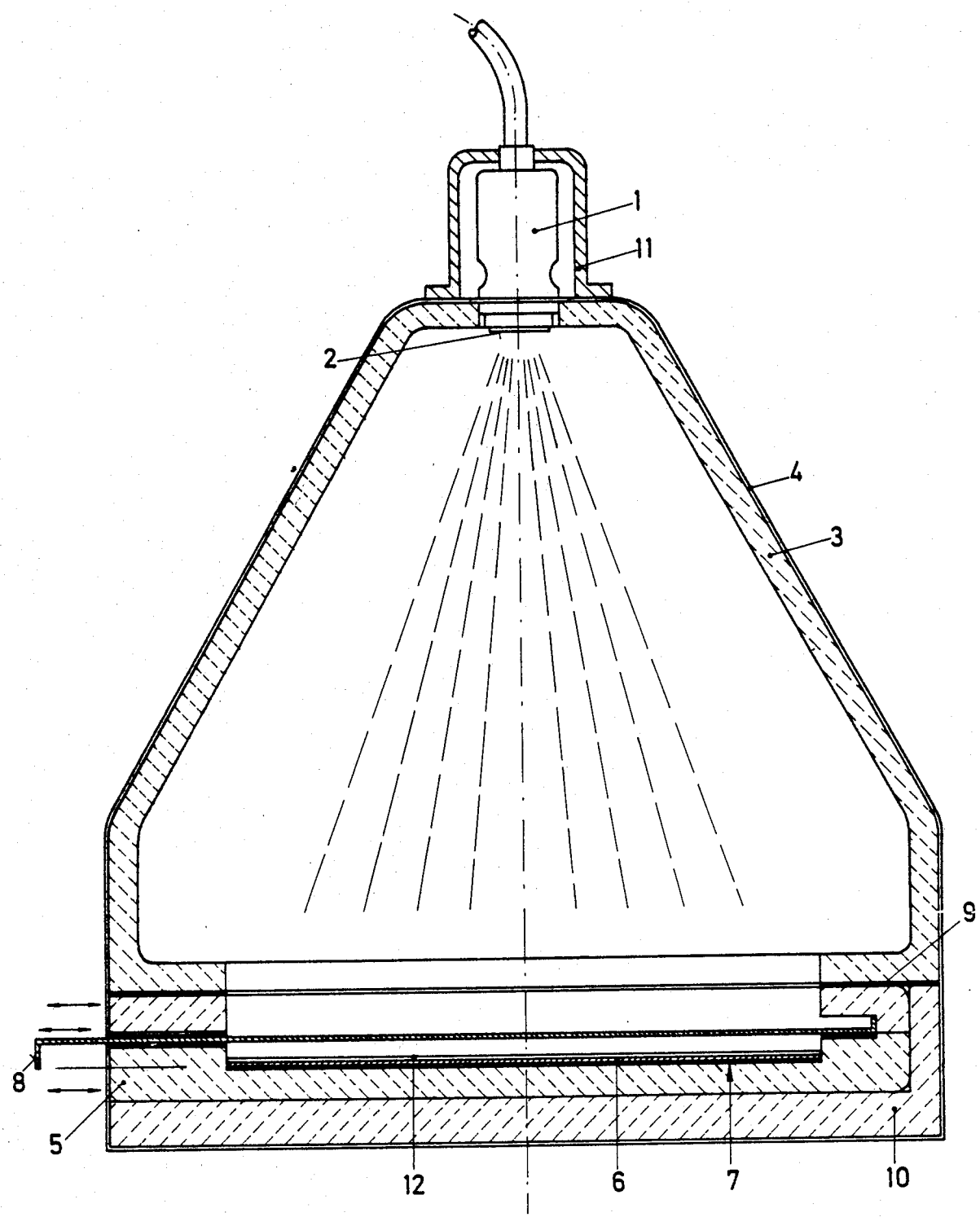
FIG. 1 is an axial section through a device according to the invention.
Figure 2:
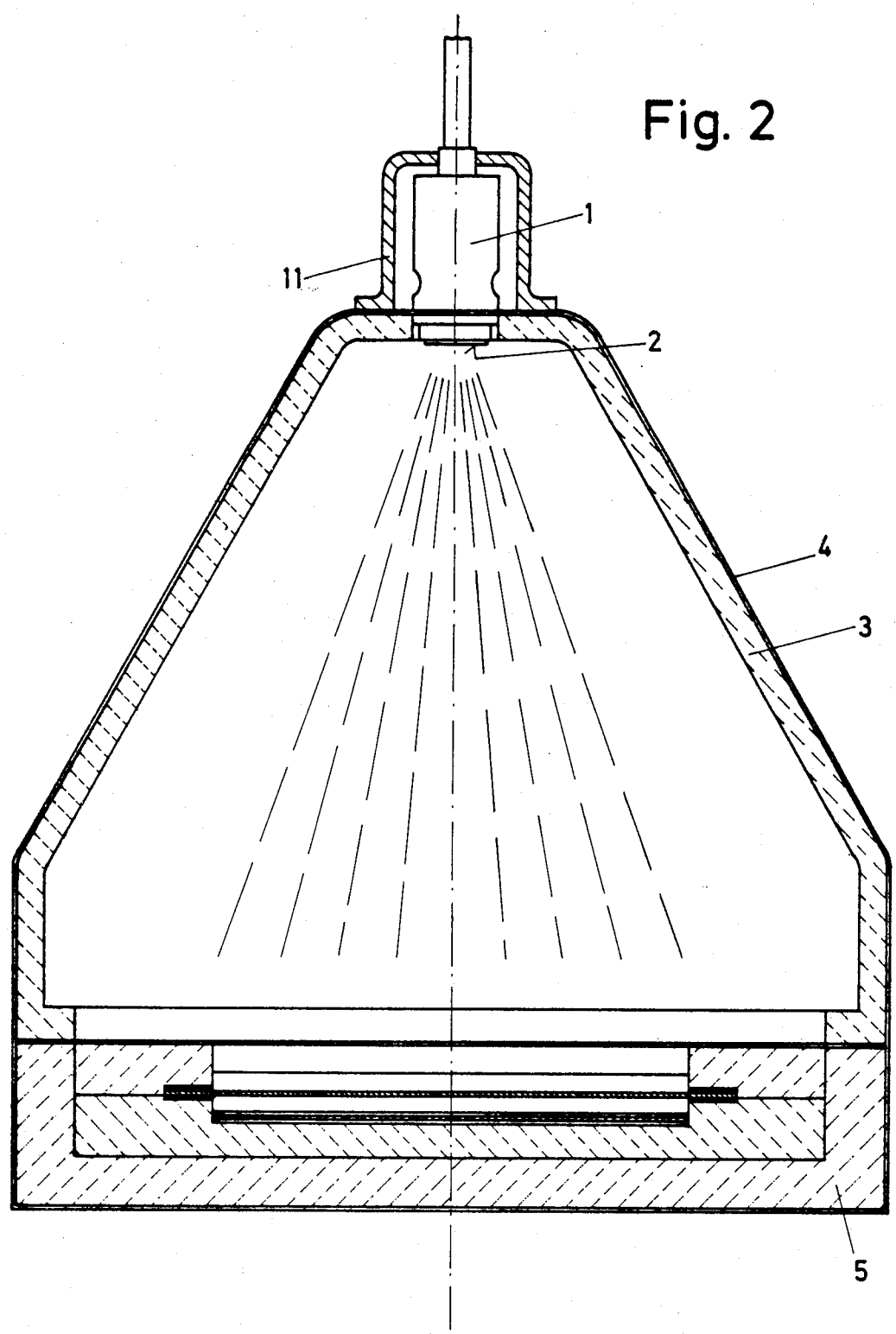
FIG. 2 is another axial section in a plane perpendicular to the section of FIG. 1 of the device.

The device illustrated in FIGS. 1 and 2 includes a source 1 of ionizing radiation, such as an X-ray tube operated, for example, between 5 and 50 kv and having a beryllium screen 2 through which the radiation projects into the interior of a diverging bell-shaped housing, which, in the particular embodiment is approximately 50 cm high and has a square base of which the sides are approximately 50 cm long. The source 1 is mounted within a protective cap or shield 11 which is made from lead 3 mm thick and which surmounts the bell-shaped housing. The housing comprises an aluminium body 3 a few millimeters thick externally covered by a 1.5 mm thick layer 4 of lead to reduce the level of harmful radiation escaping from the device. The source 1 projects into an aperture at the top of the housing. Affixed to the bottom of the housing is a base number 10, also made of aluminium with a lead covering, this base member defining a recess for accommodating a removable cassette 5 which registers with a large opening 15 in the bottom of the housing.

The cassette, in use, contains a "sandwich" consisting of the over-exposed film 12 which is to be radiographed, in close contact with the sensitive surface of a new film 6, on which an image is to be exposed, and a lead screening layer 7. This sandwich is arranged beneath a light tight cover plate 8, which, in use, is displaceable, as indicated by arrows, to expose the "sandwich" for irradiation by source 1. A light tight peripheral seal 9 prevents stray light entering the device between the cassette edges and the housing. The device accordingly is sealed mechanically, optically and is sealed with respect to radiation from the source 1.

The above described device is used to derive information from the over-exposed regions of film 12, by taking a radiograph of the image of film 12, this being considered as the object to be on film 6 image. This radiograph is taken in the same manner as a conventional radiograph by exposing the "sandwich" in a controlled manner to radiation from source 1, and its resolution, sensitivity and maximum efficiency depend on the quality and density of the film 12.

The resulting radiograph obtained on film 6 supplies an image of the information in the layers of silver in film 12. Because of the thinness of the silver layers, the radiograph is made on film 6 at a very low operating voltage of source 1, preferably between 5 and 15 Kv, depending on the distance between source 1 and the "sandwich" or the sensitivity of film 6.

After selection of the type of film 6 to be used, the conditions for exposure to take the radiograph can be determined e.g. 12 Kv, 10 mA, 180 second exposure. Optimum results are obtained if, for example, the initial radiograph is made on a high-speed film 12, which thus has a relatively thick silver layer so as to provide better contrast in the final radiograph.

The technique employing the above method and apparatus enables a large amount of useful information to be obtained from an over-exposed film 12, where it would otherwise have been lost and hidden in the over-exposed regions. Moreover, the method of recovery is relatively simple, since it does not require further irradiation of the test component only the initial film.

Figure 3:
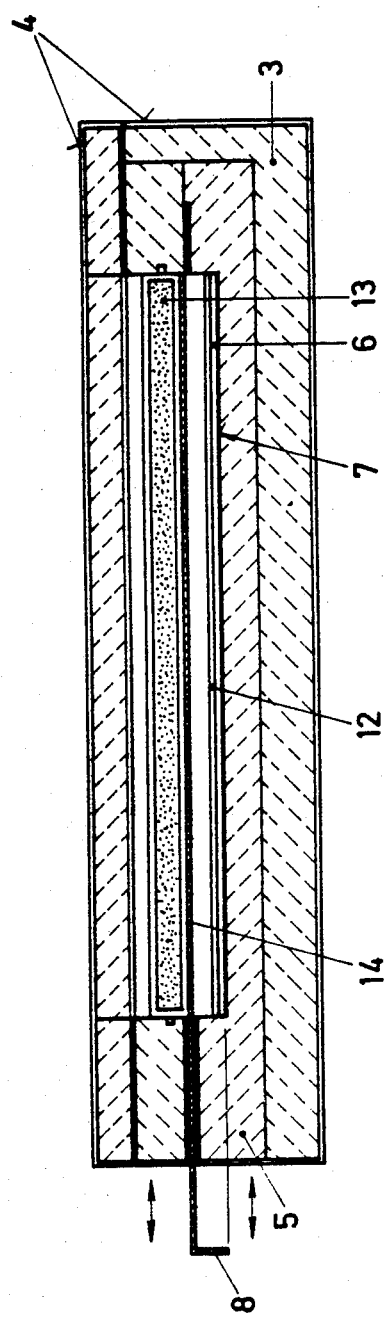
FIG. 3 is a section through another device according to the invention.

In the embodiment of FIG. 3, in which like reference numerals indicate like elements as in the preceding figures, the device is simplified with regard to both its construction and operation. The radiation source in FIG. 3 is a radioactive isotope, e.g. $Fe^{55}$ in homogeneous solution 13 contained within a sealed container 14 preferably having the same dimensions as the film to be radiographed. The resulting ionizing source is monochromatic and homogeneous over the entire exposure surface, the device is independent of a voltage source and is portable and lasts indefinitely.

The present invention is not limited to the embodiments illustrated in the accompanying drawings, since various modifications can be made without departing from its scope. For example the interior of the device can be evacuated, thus eliminating the absorption of the ionizing radiation in air and reducing the voltage required for the ionizing source.

As in the embodiment in FIG. 3, use can be made of any suitable kind of isotope or $\beta$ source or bremsstrahlung.

We claim:

1. A radiographic device for use in deriving information from an over-exposed region of a first film, comprising:
    a light-tight housing, having a first end with an opening permitting the passage of ionizing radiation therethrough,
    a source of ionizing radiation mounted to a second end of said housing opposite the first for projecting ionizing radiation into said housing and through said opening,
    a base plate attached to said first end of said housing and defining a recess adjacent said opening,
    a removable cassette mounted in said recess to receive ionizing radiation passing through said opening, said cassette carrying the first film in close contact with a second film on which said information is to be recorded and having a light-tight cover protecting said second film from exposure which is displaceable to permit exposure of said second film to an image produced by irradiation of the first film by the source, and
    a layer of lead covering the exterior of said housing and base plate.

2. A radiographic device according to claim 1 wherein the source of ionizing radiation is an X-ray source, and the housing includes wall portions which diverge in a direction from the source toward the cassette.

3. A radiographic device for use in deriving information from an over-exposed region of a first film comprising:
    a light-tight housing;
    a source of ionizing radiation mounted within said housing, said radiation source comprising a homogeneous monochromatic isotope solution and a flat container for holding said solution,
    a removable cassette mounted within said housing for carrying said first film in close contact with a second film on which said information is to be recorded, said cassette having a light-tight cover protecting said second film from exposure which is displaceable to permit exposure of said second film to an image produced by irradiation of the first film by said radiation source, said flat container being of substantially the same dimensions as said first film and disposed generally to confront said first film upon displacement of said light-tight cover.

4. A radiographic device according to claim 3 wherein the homogeneous monochromatic isotope solution contains a single isotope.

5. A radiographic device according to claim 3 or claim 4 wherein the homogeneous monochromatic isotope solution contains $Fe^{55}$.

6. A method of deriving information from an over-exposed region of a first film comprising:
    placing the first film in direct contact with an unexposed second film in a film cassette, loading the film cassette in a light-tight housing of which the outer surface is covered with a layer of lead, and
    irradiating the first film with ionizing radiation from a source thereof for a controlled period to expose said second film to an image containing said information said source being a homogeneous monochromatic isotope solution held in a flat container which is of substantially the same dimensions as the first film and which confronts said first film during irradiation.

7. A method according to claim 6 wherein the homogeneous monochromatic isotope solution used contains a single isotope.

8. A method according to claim 7 wherein the homogeneous monochromatic isotope solution used contains $Fe^{55}$.

* * * * *